United States Patent
Tidwell

(10) Patent No.: US 6,760,036 B2
(45) Date of Patent: Jul. 6, 2004

(54) EXTENDED PRECISION VISUAL SYSTEM

(75) Inventor: Reed P. Tidwell, Centerville, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 223 days.

(21) Appl. No.: 09/892,592

(22) Filed: Jun. 27, 2001

(65) Prior Publication Data

US 2003/0011615 A1 Jan. 16, 2003

(51) Int. Cl.[7] .................................................. C09C 5/02
(52) U.S. Cl. ........................ 345/600; 345/605; 345/690; 345/589; 348/391.1; 348/488; 708/497; 708/551
(58) Field of Search ................................. 345/600, 605, 345/690, 426, 428, 589; 348/384.1, 390.1, 391.1, 488; 708/497, 551

(56) References Cited

U.S. PATENT DOCUMENTS

| 5,408,249 A | * | 4/1995 | Wharton et al. ............. 345/690 |
| 5,612,710 A | * | 3/1997 | Christensen et al. .......... 345/30 |
| 5,625,768 A | * | 4/1997 | Dye ............................. 345/441 |

* cited by examiner

Primary Examiner—Matthew C. Bella
Assistant Examiner—Antonio Caschera
(74) Attorney, Agent, or Firm—Thorpe North & Western LLP

(57) ABSTRACT

A method for extending the data width of a graphics processing channel in a computer graphics system. The method includes the first step of providing a plurality of graphics processing channels having pre-defined output data widths or capacities. The next step is combining at least a portion of an output from at least two of the plurality of graphics processing channels. Another step is defining at least one extended graphics processing channel with an extended data width. The extended graphics processing channel is formed with output portions from the plurality of graphics processing channels.

24 Claims, 8 Drawing Sheets

——— 1 step accuracy
——— 4 step accuracy

EXTENDED PRECISION VISUAL SYSTEM

1. FIELD OF THE INVENTION

The present invention relates generally to expanding the data width of a computer graphics system. More particularly, the present invention relates to extending the data width of a computer graphics system for displaying extended precision or increased dynamic range in simulated graphics.

2. BACKGROUND

Infrared optics, cameras, telescopes and viewfinders have become relatively less expensive and more prevalent in recent years. Specifically, infrared (IR) is used extensively in such applications as military viewfinders, night vision goggles, vehicle night displays and similar applications.

Frequently, the military and other organizations train pilots or personnel who desire to be able to effectively use vehicles and IR equipment. It is preferable to be able to train these personnel in simulated equipment because of the reduced cost. Accordingly, it is important to be able to simulate sensor imagery in training situations such as the simulation of cockpit displays in a vehicle simulation environment for aircraft, ships and tanks. In addition, it is valuable to simulate IR imagery for guided missile applications.

Many entities, such as the US armed forces and commercial training installations, currently utilize such vehicle and IR simulations. These groups are actively seeking to update outdated and more expensive workstation-based equipment with PC-based simulation equipment and other off the shelf simulation equipment. PC-based solutions have generally been unable to simulate extended precision graphics and/or the IR dynamic range because conventional off-the-shelf graphic chips for PCs do not have the increased data width channels required for effective extended precision or increased dynamic range simulation.

The precision requirements for high precision color graphics, monochrome, and IR have traditionally been solved using custom processors with built-in high data width channels of 16 or more bits and frame buffers built to store the high precision image. Such systems are relatively rare and are costly. System designers have generally believed that where a high precision channel was needed, a processing channel with the corresponding data width should be provided. If 16 bits of precision has been needed, than a hardware defined channel that includes a 16-bit data width has been built into the system. Including a special channel that is only used for a specific purpose (such as IR) increases the cost of the overall computer graphics system.

To solve these problems and produce a high fidelity simulation (especially for IR), a system must meet the following criteria. The solution must provide a well-behaved visual output that is devoid of distracting artifacts, and have a large dynamic range to represent very hot to very cool objects in infrared simulations. In addition, numerical accuracy must also exist across the full dynamic range.

SUMMARY OF THE INVENTION

The invention provides a method for extending the data width of a graphics processing channel in a computer graphics system. The method includes the first step of providing a plurality of graphics processing channels having pre-defined output widths. The next step is combining at least a portion of an output from at least two of the plurality of graphics processing channels. Another step is defining at least one extended graphics processing channel with an extended data width. The extended graphics processing channel can be formed with output portions from the plurality of graphics processing channels.

In accordance with another embodiment of the present invention, the system includes a method for increasing the data width of a graphic system for rendering polygons having polygon vertices and intensities associated with the polygon vertices. The first step of the method is providing a plurality of graphics channels having a defined channel data width. The next step is dividing the intensities of the polygon vertices into a base and an offset. Accordingly, at least one extended data width graphics channel is created by processing the base and offset through separate graphics channels. Yet another step is combining the results of the processing of the base and offset to produce an extended data width for the polygons.

In accordance with another embodiment of the present invention, the system may include a method for increasing the dynamic range of a graphic system for rendering polygons. The method comprises the first step of providing a plurality of graphics channels. The next step is restricting the dynamic range for separate polygons to a subset of the graphic system's entire dynamic range. Another step is increasing the dynamic range of the plurality of graphic channels by using a base and offset to represent the restricted dynamic range for separate polygons.

Additional features and advantages of the invention will be apparent from the detailed description which follows, taken in conjunction with the accompanying drawings, which together illustrate, by way of example, features of the invention.

DETAILED DESCRIPTION

Figure 1:
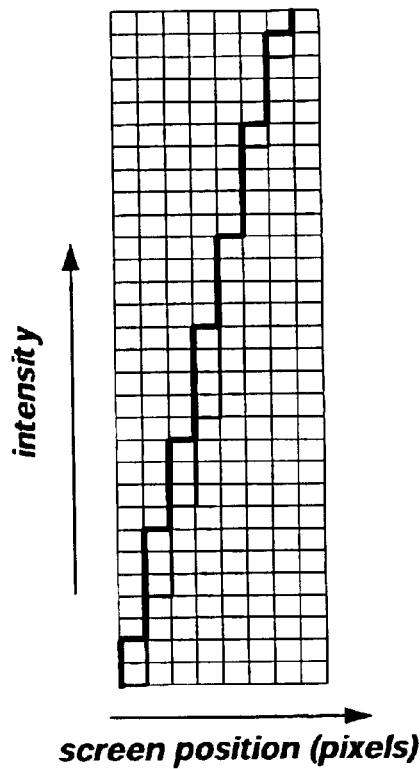
FIG. 1 illustrates that a floating point step size can be varied to avoid banding.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Computer graphics systems desire to faithfully simulate high precision imagery, such as high precision color images, infrared (IR) sensor simulations, and particularly IR sensor displays. To accurately simulate high precision imagery, it is preferable to have pixel shading precision that extends beyond the 8–10 bits that is most frequently used for color visual simulation.

There are at least two reasons for providing extended data width in a computer graphics system or more specifically in an infrared system. The first reason is to extend the dynamic range of the pixel shading, which allows the graphics system to represent hot items accurately without saturating those portions of the graphics image. This is implemented using additional data bits to allow higher intensities to be represented (e.g., to the left of the binary point). The second reason is to extend the precision of the pixel shading which minimizes quantization banding artifacts under conditions of high gain. This is realized using additional data bits to represent smaller, more precise, intensity steps (e.g., to the right of the binary point).

It is also valuable to be able to extend the pixel data width of any graphics system when the hardware channels included in that system are limited to a pre-defined or hardwired data width. For example, pixel data widths of 12 or more bits may be desired in a system that only has 8-bits for each channel output. Widely available and cost-effective graphics accelerator chips have an 8-bit per-component color output because this provides 256 steps of precision for each of the RGB channels or 24 bits of overall data width with all the channels combined. In some of these chips, the calculations are done to 10 or 12 bits internally, but only 8-bits per color component are delivered out of the chip to the frame buffer. The rendering processes in these systems also perform their operations using 8-bit channels. Accordingly, if 12-bit data width is desired from an 8-bit architecture, the system must be re-configured for such processing.

Simulation system users have desired to use 8-bit components (such as in PC-based simulation) for simulation of IR imagery and high precision color graphics to create 12 to 23-bits of data width because this allows them to use common, low-cost graphics accelerators. Since these graphics chips are designed to produce 24-bit colors at 8-bits of intensity resolution, the pins and the frame buffer storage exist to accommodate the extended precision numbers, but using them for extended dynamic range and/or precision can create significant problems.

One major problem is that only 8-bits of intensity data are output from each channel. The channels are independent so there is no built-in capability to perform texture multiplies between channels. For example, the channels are not generally designed to perform a 16×8 bit texture multiply. In addition, the color interpolation can never produce more than 256 intensity steps across a given polygon. This leads to potential banding for any polygons that span more than 256 pixels on a side.

An embodiment of this invention includes an improved method for processing higher precision data through lower precision graphics channels. Specifically, an intensity is divided into an integer or floating-point base (not interpolated) and floating-point offset (interpolated) components for processing through separate graphics channels. Then the output of the channels is re-constructed after the frame buffer. Further, texturing and fog are stored separately and applied after the frame buffer.

A more specific embodiment of this invention is a PC-based method and system using readily available 8-bit graphics accelerators. This results in lower hardware cost while providing a high precision output. The method produces true 12+ bit accurate pixels that may be output digitally and post-processed after the frame buffer. The post processing can include noise to simulate a hardware IR display.

Accordingly, this method can provide extended precision monochrome images using conventional precision color hardware. This is useful for other applications such as night vision goggle (NVG) simulation. Although infrared is described in this description as one embodiment of the invention, the method and system are not limited to IR but can also be used to extend the data width of any graphics system that is willing to reduce the number of processing channels available, in return for extended data width through the remaining channels.

One detailed method for implementing the invention described will now be discussed. The RGBA channels are used to divide the bits of the extended data width channel between the hardware defined RGBA channels. This takes advantage of the fact that modulation texture is multiplicative. Therefore, the pixel intensity $I_p$ can be divided into components $$I_p = a + b + c$$

and a texture T, applied to each of the components. By the associativity of multiplication over addition, the results can be added back together to get the intensity of the textured pixel:

$$TI_p = Ta + Tb + Tc$$

Similarly, the interpolated components add together to produce the interpolated intensity. Then the issue is the accuracy of the component calculations.

Floating point numbers may be used to represent the separate components. The results are accurate if the exponents are constant at each vertex and no texture is applied to exponents. This means that interpolation and texture modulation occur only on the mantissas.

$$a = m_a \times f_a$$

$$b = m_b \times f_b$$

$$c = m_c \times f_c$$

$$I_p = m_a f_a + m_b f_b + m_c f_c$$

Where m is a mantissa, and f is a scaling factor.

For example, the total intensity value $I_p = 893$ can be represented as:

| | | | |
|---|---|---|---|
| a = 38 | = $m_a \times f_a$; | $m_a = 38$, | $f_a = 1 = 2^0$ |
| b = 256 | = $m_b \times f_b$; | $m_b = 1$, | $f_b = 256 = 2^8$ |
| c = 599 | = $m_c \times f_c$; | $m_c = 37.4375$, | $f_c = 16 = 2^4$ |

Thus, $Ip = f_a m_a + f_b m_b + f_c m_c =$
$(38 \times 2^0) + (1 \times 2^8) + (37.4375 \times 2^4) = 893$.

Texture may then be applied to mantissas to form the textured pixel value $$TI_p = (Tm_a \times f_a) + (Tm_b \times f_b) + (Tm_c \times f_c)$$

Figure 2:
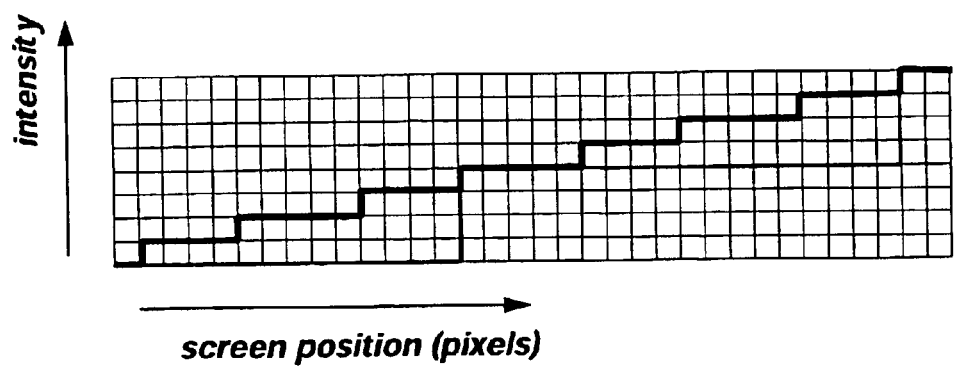
FIG. 2 illustrates the banding caused by a reduced precision for a selected intensity dynamic range.

The number of bits of accuracy required for a given pixel is a function of the intensity of a given pixel relative to surrounding pixels. If the intensity gradients dI/dx or dI/dy are high, great precision at each pixel is not required. However, if the intensity gradient is small, then a higher accuracy is required to avoid banding. The graphs of FIGS. 1 and 2 illustrate this frequently observed phenomenon. Since FIG. 1 includes a gradient of 4.5 steps/pixel, an accuracy of 4 intensity steps is sufficient to avoid banding.

FIG. 2 illustrates an intensity gradient of 1/4.5 steps/pixel (i.e., one step for every 4.5 pixels). With an intensity gradient of 1/4.5 steps/pixel, a precision of 4 steps is prone to cause severe banding. Even 1 step/pixel is subject to banding, depending on the size of the step and the intensity level. The point is that a large step size by itself does not necessarily cause banding. Bigger steps (or lower precision) are more effective for large gradients, while small steps (or greater precision) are more effective for small gradients. The banding in FIG. 2 is caused because the intensity step size is greater than the gradient.

This invention can use a floating-point step size for the intensity gradient, because it allows the flexibility to avoid banding in both the large and small gradient situations. A general solution to overcome artifact and banding problems is to increase the dynamic range by allowing higher brightness values to be specified at the vertices. The minimization of artifacts and banding can be accomplished by insuring that the intensity step size is always smaller than the intensity gradient. Of course, reducing the minimum step size by using even higher precision also helps.

There are several ways to increase the brightness values at the polygon vertices. The most straightforward of these involve dividing a high data width vertex intensity into several components, and then processing them through the ARGB channels of the graphics processor. The processed results are then added together after the frame buffer.

Figure 3:
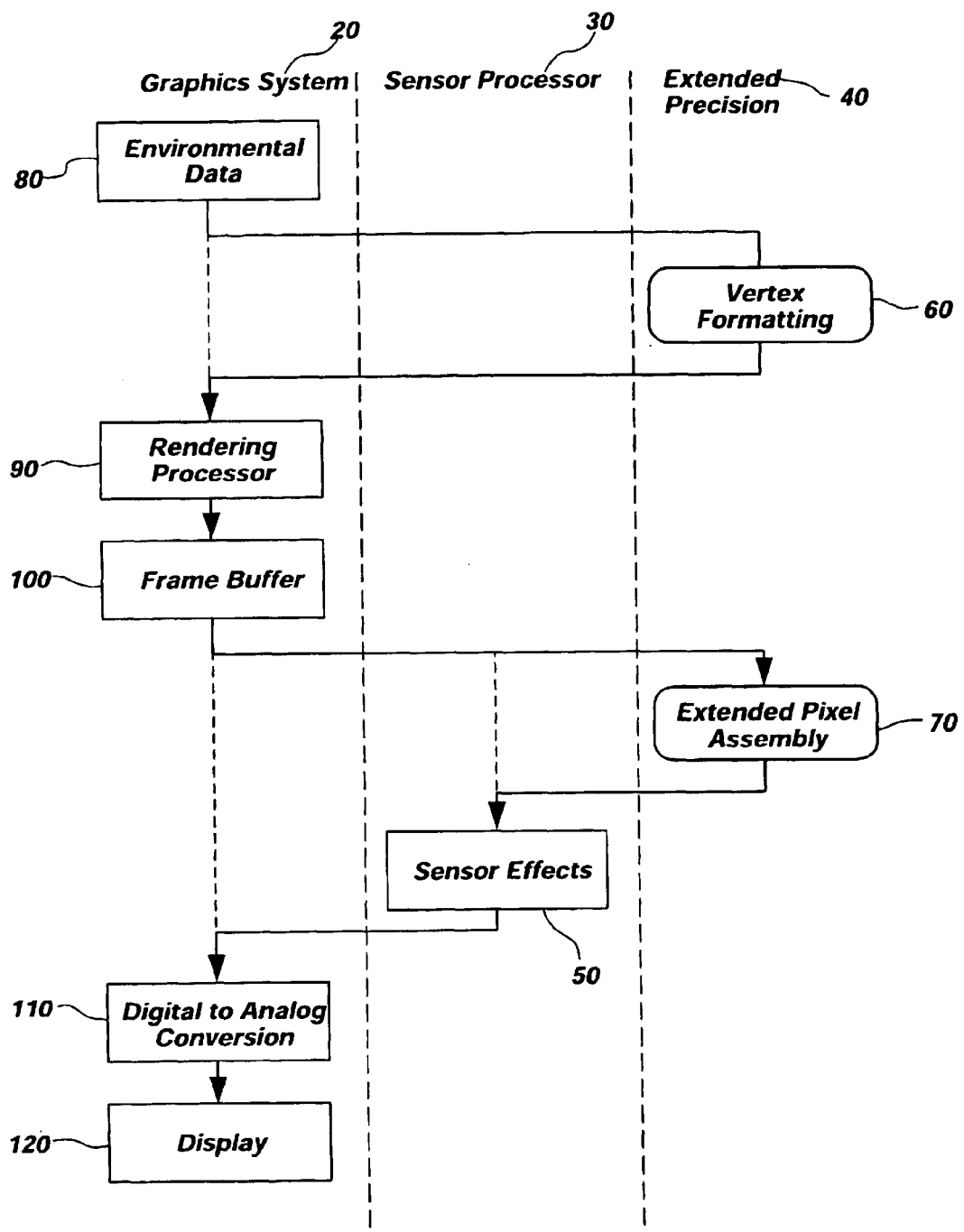
FIG. 3 is a block diagram illustrating a graphics pipeline containing the present invention.

FIG. 3 is a high-level block diagram of an extended data width visual graphics system. The blocks shown under Graphics System column 20 are the elements found in conventional color graphics systems and are understood by those skilled in the art. The sensor effects component 50 shown under the Sensor Processor column 30 refers to common effects used for simulation of sensors such as automatic gain control, ac coupling and noise. The column titled Extended Precision 40 contains the vertex formatting 60 and pixel assembly steps 70 that will be explained in further detail here. The dotted lines in the figure represent the data flow in the absence of sensor simulation processing and/or extended precision graphics processing. For example, in a conventional graphics system, environmental data 80 would be sent directly to the rendering processor 90, and data in the frame buffer 100 would go directly to the digital to analog conversion component 110 before it is transferred to the display 120.

In the vertex formatting module 60, the intensity (e.g., monochrome) is divided into a base and offset. The base represents the minimum vertex intensity, and it is identical in all 3 vertices. The offset component represents the amount that each vertex varies in intensity from the base. The offset is represented as a floating-point number, with a mantissa that is at least 8-bits. The offset mantissa value is interpolated in the rendering engine as part of the shading process. In this way, the step size tracks the intensity gradient by accommodating polygons that span the entire dynamic range as well as those that have a smaller (only a few least significant bits (LSBs)) difference between vertices. Separating out the offset from the base insures that the interpolation is monotonic at every step size. This avoids large steps that create banding or steps that go in the wrong direction which create oscillations.

The base and offset are mapped to the separate color channels of the rendering processor for rendering to the frame buffer. For example, in monochrome pixel assembly, the color components from the frame buffer are combined to form a single, high data width monochrome intensity prior to being processed to add sensor effects.

Textures in prior art imaging systems are interpolated to 8-bits of precision. To apply texture maps to the mantissas of the base and offset intensities, texture maps can be created with identical values in Red, Green and Blue (RGB) or as a monochrome lookup table. No texture is applied to the exponents (i.e., equivalent to a uniform texture of 1). For externally applied texture, a dedicated texture channel may be used in which the vertex intensity is always 1. Texture is applied to the dedicated channel and the modulation of intensity occurs externally.

The software drivers for the rendering hardware are configured to break-up each vertex intensity into several components that can be loaded into each vertex register in the rendering engine. The system determines the minimum intensity for the entire polygon that is used as the base and the difference between the base and each vertex intensity is the offset. The base and offset are both converted to provide a mantissa and exponent that can be processed in separate channels.

In addition to the advantages accrued by formatting data for the vertices, the subdivision of polygons can further minimize banding. The basic criterion is that the intensity step size should generally not be greater than the intensity gradient. This method helps avoid polygons that have adjacent pixels at the same interpolated intensity and helps eliminate the banding problem of FIG. 2. An exception to this is where the step size is one least significant bit (LSB) and the offset exponent=0. This criterion can be described in more mathematical terms, $$\text{step size} < \delta I / \delta e$$

(<=means less than or equal) or $$2^{(\textit{offset exponent})} < \delta I / \delta e$$

where I is the intensity, e represents the length in pixels along an edge, and $2^{(\textit{offset exponent})}$ is the step size.

In all but the most extreme cases of large polygons viewed edge on, $\Delta I / \Delta e$ is a reasonable approximation of $\delta I / \delta e$. The offset exponent is chosen to maintain the maximum number of significant bits:

$$\text{offset exponent} = \text{int}[\log_2 \Delta I] - 7$$

Since, $\text{int}[\log_2 \Delta I] < \log_2 \Delta I$, $$2^{(\textit{int}[\log_2 \Delta I] - 7)} <= 2^{([\log_2 \Delta I] - 7)},$$

$$2^{(\textit{offset exponent})} < \Delta I / 128 < \Delta I / \Delta e$$

Thus, $$2^{(\text{offset exponent})} < \Delta I/128 < \Delta I/\Delta e$$

is always true if Δe is less than 128.

As was shown above, polygon subdivision is not necessary for polygons with edges less than 128 pixels in length. Subdivision is also not necessary if there are less than 256 intensity steps, in which case the offset exponent is 0. This helps keep the step size less than or equal to the gradient. In other words, polygons with sides that are longer than 128 pixels and have intensity variations of more than 256 are subject to banding at high gains and are preferably subdivided. This will usually be a small minority of polygons.

If the graphics hardware driver knows the gain and offset, additional conditions can be used to minimize the number of polygons that need to be subdivided. For example, at low gain, some least significant bits have no effect on the final image and this allows larger step sizes to be used.

FIGS. 4–5, 8–9, and 11–12 are the data formats and pixel assembly diagrams of implementations for performing 12, 16 and 23-bit extended precision processing using the method described above. This method is particularly effective for monochrome IR simulation.

Figure 4:
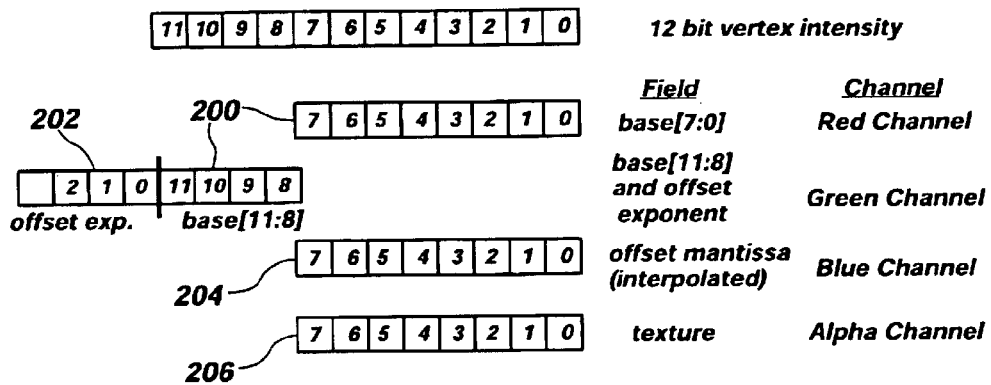
FIG. 4 illustrates the vertex data format for a 12-bit implementation of a base and offset architecture for expanding the data width.

"FIG. 4 illustrates a 12-bit vertex data format with external texture. Specifically, the figure shows the mapping of base and offset components into the RGBA channels of the rendering processor. The 12-bit integer base intensity 200 is mapped into bits 4:0 of the green channel and bits 7:0 of the red channel. The floating point offset maps to the blue and green channels, with the 3-bit exponent 202 stored in green bits and the 8-bit mantissa 204 in bits 7:0 of the blue channel. The base and offset exponent are the same for all 3 vertices and are therefore constant over the whole polygon. Only the offset mantissa differs at each vertex and is interpolated at each pixel. Texture processing is performed in the alpha channel 206."

Figure 5:
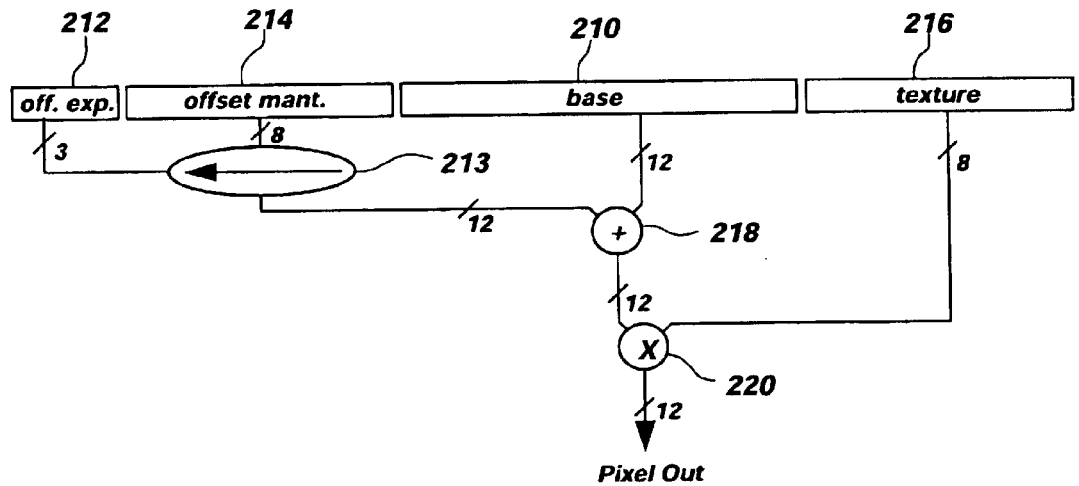
FIG. 5 is a schematic diagram of the pixel assembly hardware for a 12-bit implementation of a base and offset architecture.

FIG. 5 illustrates the pixel assembly for a 12-bit embodiment using external texture. The figure also shows how the outputs of the frame buffer are combined to form the output pixel. The offset exponent 212 is used to reconstruct the offset by shifting 213 the offset mantissa 214. The base 210 is then added 218 and the result is multiplied 220 by the texture value 216 to form the 12-bit output pixel. This reconstruction occurs after the frame buffer in the extended pixel assembly 70 module of the system (refer to FIG. 3), when the completed image is scanned out for display.

Figure 6:
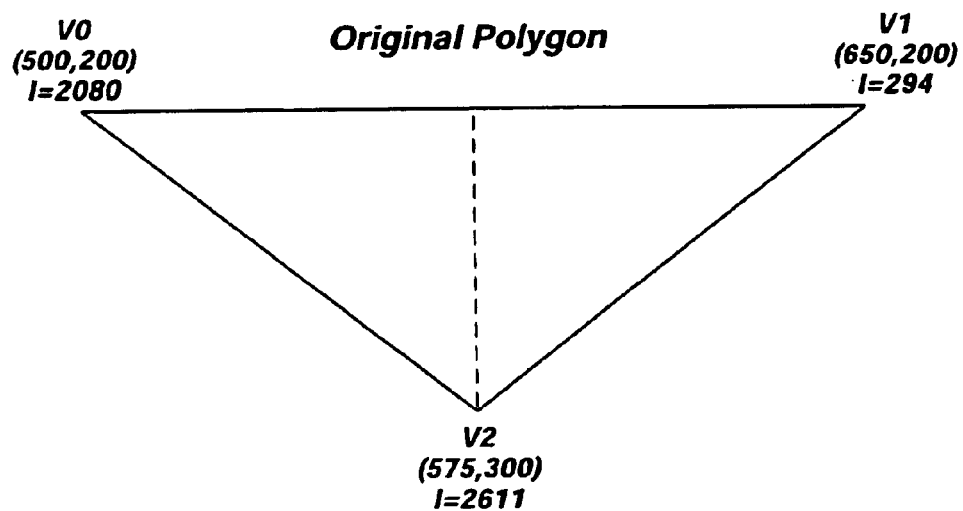
FIG. 6 illustrates using a polygon 12-bit intensities as in FIG. 4.
Figure 7:
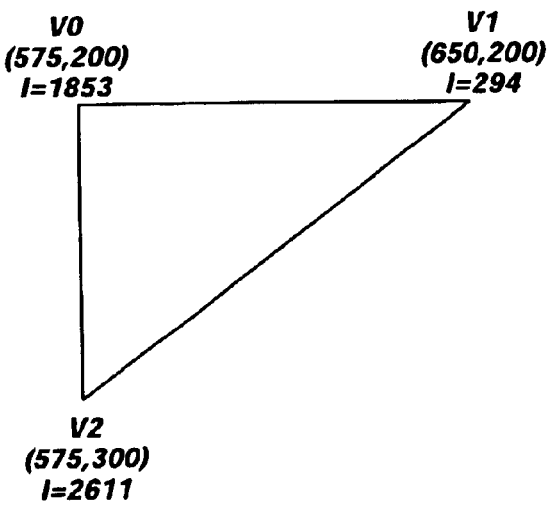
FIG. 7 illustrates using 12-bit intensities with polygon subdivision.

FIGS. 6 and 7 are examples of 12-bit intensities and polygon subdivision. In the figures, I represents intensity. The base or intensity base for the polygon is 294. The polygon intensity range is 294–2611 which provides an intensity range of 2317. The edge lengths are 125 (V0 to V2), 125 (V1 to V2) and 150 (V0 to V1). Since the intensity range is greater than 256 and one of the edges (e.g., V0 to V1) is longer than 128 pixels, the polygon can be subdivided.

FIG. 7 shows one piece of the divided polygon of FIG. 6. In the newly created polygon, the base or intensity base is still 294, and the same intensity range of 2317 still exists. The difference in this case is that the edge lengths are now 125, 100 and 75 which are all less than 128 pixels. This subdivision helps avoid banding in this sub-divided polygon. The offsets will then be divided and processed accordingly:

Vertex 0- Offset = 599; Mantissa = 37; Exponent = 4.
Vertex 1- Offset = 0; Mantissa = 0; Exponent = 4.
Vertex 2- Offset = 2317; Mantissa = 145; Exponent = 4.

Figure 8:
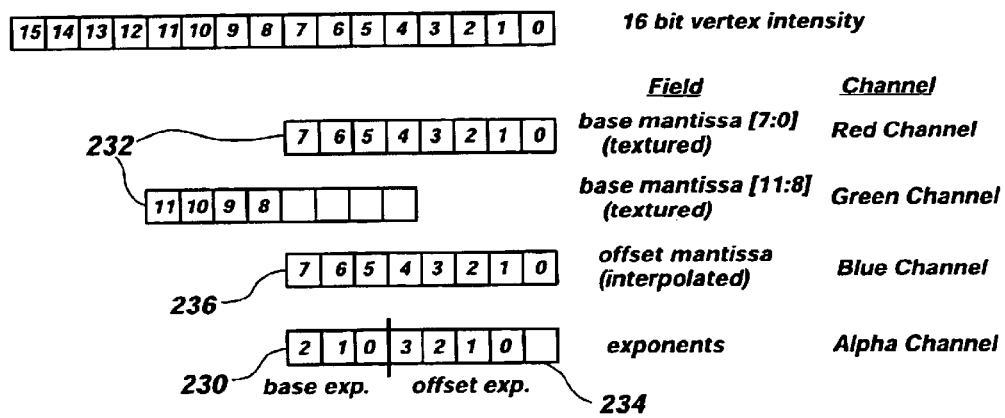
FIG. 8 illustrates the vertex data format for a 16-bit implementation of a base and offset architecture for expanding the data width.

FIG. 8 illustrates a 16-bit vertex data format with internal texture. The figure also illustrates the mapping of base and offset components into RGBA channels of the rendering processor for 16-bit intensities. In this case, both the base and the offset are represented as a floating-point number. The base has 3 bits of exponent 230 and 12 mantissa bits 232. The offset has 4 bits of exponent 234 and 8 mantissa bits 236. Only the offset mantissa is interpolated, but both the base mantissa and the offset mantissa are modulated by texture during rendering. The green channel has bits 3:0 unused at the vertex level. These 4 bits can be used to maintain more bits of accuracy after texture is applied in the green channel. As with the 12-bit case of FIG. 4, only the offset mantissa varies at each vertex, and is the component that is interpolated.

Figure 9:
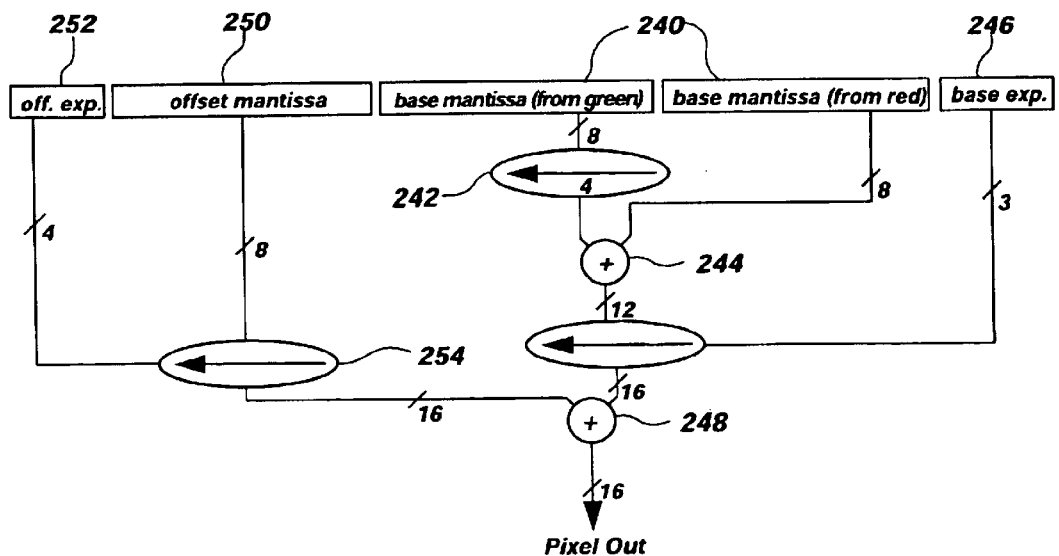
FIG. 9 is a schematic diagram of the pixel assembly hardware for a 16-bit implementation of a base and offset architecture.

FIG. 9 shows how the 16-bit pixels are assembled from the components that have been processed through the rendering component and stored in the frame buffer. The base mantissa 240 comes from both the red and green channels. The more significant bits in the green channel are left shifted 242 by 4 to align properly with the least significant bits of the base mantissa in the red channel. These are added 244 and left shifted further according to the base exponent 246. This complete base is then added to the offset 248, after the offset mantissa 250 has been left shifted 254 by the offset exponent 252 for alignment purposes. The final result of this adding operation is the 16-bit output pixel.

Figure 10:
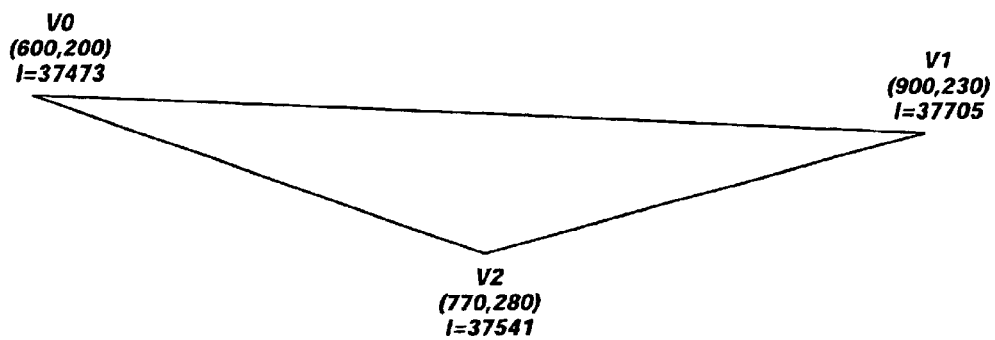
FIG. 10 illustrates an example of a 16-bit intensity polygon.

FIG. 10 is an example of 16-bit polygon intensity where subdivision would not be required. The base or intensity minimum for the polygon is 37473 and the intensity range is 232. Since the intensity range is less than 256, no subdivision is required.

Figure 11:
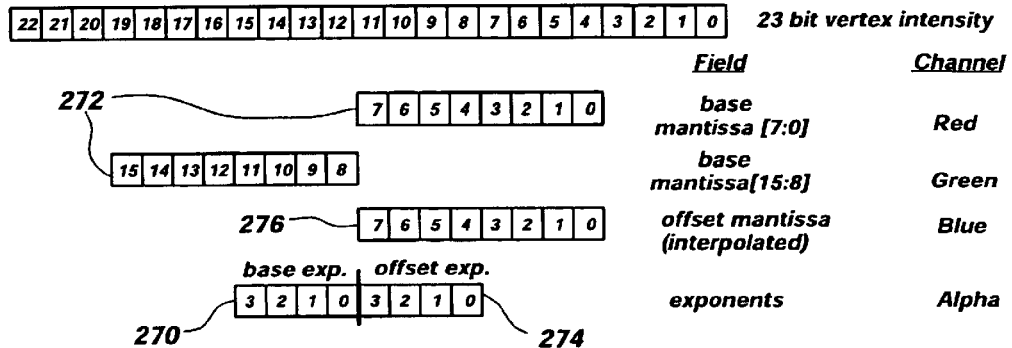
FIG. 11 illustrates the vertex data format for a 23-bit implementation of a base and offset architecture for expanding the data width.

FIG. 11 shows the data formats or encoding for a 23-bit intensity vertex that is non-textured. This is similar to the 16-bit case of FIG. 8 except that both the base and the offset have a larger data width. The base has 4 bits of exponent 270 and 16 bits of mantissa 272. The offset has 4 bits of exponent 274 and 7 bits of mantissa 276. In this case, texture cannot be accurately applied internally because the result of modulating the green channel with texture would be severely stepped since there are no low order bits that overlap. If texture is applied, it can be calculated separately by a parallel rendering processor, or by some other means.

Figure 12:
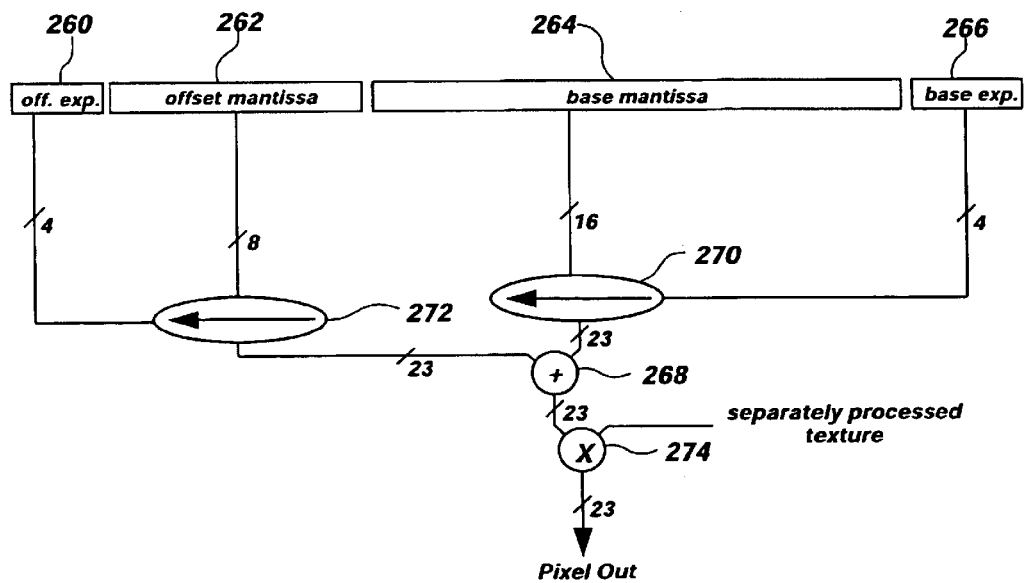
FIG. 12 is a schematic diagram of the pixel assembly hardware for a 23-bit implementation of a base and offset architecture.

FIG. 12 shows the method for reconstructing a 23-bit pixel based on the data formats shown in FIG. 11. The base mantissa 264 and offset mantissa 262 are converted to integers by left shifting 270, 272 the mantissa by the exponents 260, 266. The base and offset are then added 268, and the result is optionally multiplied 274 by a separately processed texture value. Note that these are only some of the possible component mappings that could be used to create pixel intensities of various bit widths.

Figure 13:
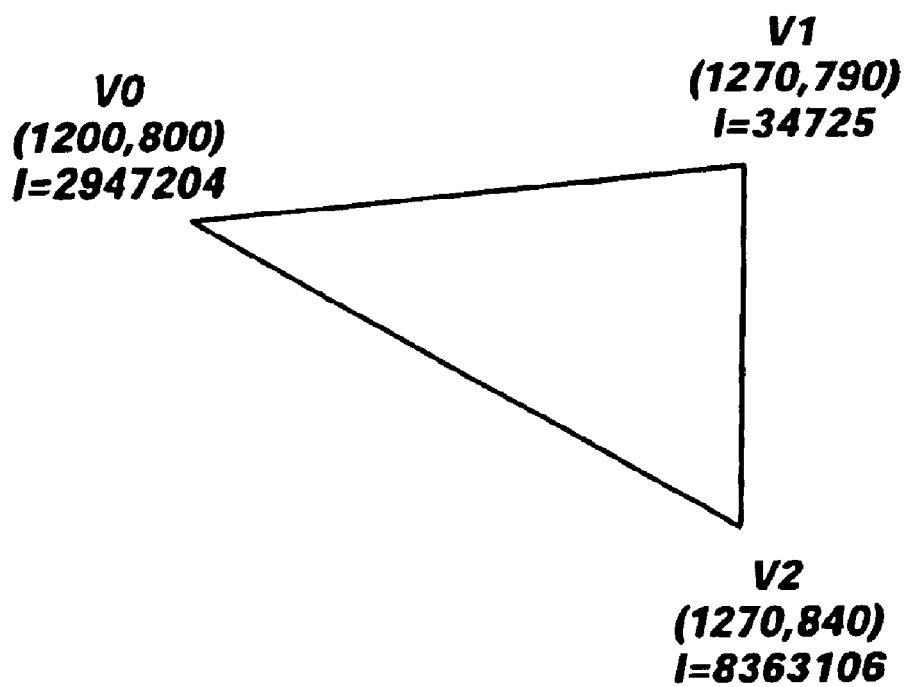
FIG. 13 illustrates an example of a 23-bit intensity polygon.

FIG. 13 is an example of a polygon with 23-bit intensity. The base or intensity minimum for the polygon is 34725 and the intensity range is 8328381. Since the edge lengths are 50, 80.6, and 70.7, all the edges are less than 128 pixels and subdivision is not required.

The graphics processing channels that have been shown in the embodiments above use 8-bit processing and data widths. It should be realized that a graphics channel with a larger or smaller data width could be used (e.g., 16 or 64 bit widths) and then the graphics output could be extended to exceed the data width of the original channels.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations implementation, form, function, manner of operation, and use may be made, without departing from the principles and concepts of the invention as set forth in the claims.

What is claimed is:

1. A method for extending data width of a graphics processing channel in a computer graphics system, comprising the steps of:
   (a) providing a plurality of graphics processing channels having pre-defined output widths;
   (b) combining at least a portion of an output from at least two of the plurality of graphics processing channels;
   (c) defining at least one extended graphics processing channel with an extended data width, which is formed with output portions from the plurality of graphics processing channels, with an intensity step size within a graphics processing channel's dynamic range that remains constant; and
   (d) insuring that the intensity step size is always smaller than the intensity gradient when the intensity step size is larger than the minimum intensity step size.

2. A method as in claim 1, wherein step (c) further comprises the step of producing an extended data width that exceeds the data width of any individual pre-defined graphics processing channel.

3. A method as in claim 1, wherein step (a) further comprises the step of providing a plurality of graphics processing channels that have a hardware-defined data width.

4. A method as in claim 1, further comprising the step of combining a portion of a first hardware-defined graphics processing channel and a portion of a second hardware-defined graphics processing channel to produce a virtual channel with extended data width.

5. A method as in claim 4, further comprising the step of increasing the extended data width for the virtual channel.

6. A method as in claim 5, further comprising the step of increasing the extended data width for the at least one virtual channel by increasing a number of bits of precision available to define a viewable dynamic range.

7. A method as defined in claim 1, further comprising the step of using a graphics processing channel with extended data width for monochromatic viewable output.

8. A method for expanding the data width of a graphics processing channel, comprising the steps of:
   (a) providing a plurality of graphics processing channels, each having a defined data width;
   (b) combining the output of at least two graphics processing channels to create at least one extended precision channel having an increased data width that exceeds an output data width of any individual graphics processing channel;
   (c) increasing the data width of the extended precision channel while keeping the intensity step size smaller than an intensity gradient.

9. A method for increasing the data width of a graphics system for rendering polygons having polygon vertices and intensities associated with the polygon vertices, further comprising the step of:
   (a) providing a plurality of graphics channels having defined channel data widths;
   (b) dividing the intensities of each polygon vertex into a base and an offset;
   (c) creating at least one extended data width graphics channel by processing the base and offset through separate graphics channels;
   (d) combining the results of the processing of the base and offset to produce an extended data width output for the polygons; and
   (e) using the offset to represent the amount that each vertex varies in intensity from the base.

10. A method as in claim 9, further comprising the step of interpolating only the offset between the vertices of the polygon.

11. A method as in claim 9, further comprising the step of representing the offset as a floating-point number.

12. A method as in claim 9, further comprising the step of representing the base as a floating-point number.

13. The method as in claim 9, further comprising the step of combining the processed results of the base and offset after said base and offset are retrieved from a frame buffer, to produce an extended data width output for the polygons.

14. The method as in claim 9, further comprising the step of adding the results of the base and offset after a frame buffer.

15. A method for increasing a data width of a graphics system having a plurality of graphics channels for rendering polygons, further comprising the step of:
   (a) dividing polygon vertex intensities into a base and offset;
   (b) increasing a dynamic range by allowing base values to be specified at the vertices;
   (c) processing the base and offset through separate graphics channels;
   (d) combining the results of the base and offset processing to produce an extended data width output for the polygons; and
   (e) insuring that an intensity step size is always smaller than the intensity gradient when the intensity step size is larger than the minimum intensity step size.

16. The method as in claim 15, further comprising the step of combining the results of the base and offset after the base and offset have been retrieved from a frame buffer, to produce an extended data width output for the polygons.

17. A method of increasing a dynamic range of a graphic system for rendering polygons, further comprising the step of:
   (a) providing a plurality of graphics channels;
   (b) restricting the dynamic range for separate polygons to a subset of the graphic system's entire dynamic range;
   (c) increasing the dynamic range of the plurality of graphic channels by using a base and offset to represent the restricted dynamic range for separate polygons; and
   (d) using the offset to represent the amount that each polygon vertex varies in intensity from the base.

18. A method as in claim 17, further comprising the steps of:
dividing polygon vertex intensities into a base and an offset;
reducing the number of effective graphics processing channels by processing the base and offset through at least two graphics channels to define an extended data width channel; and
adding up the results of the base and offset for output to a display.

19. A method of increasing a dynamic range of a graphics system for rendering polygons, further comprising the steps of:
(a) providing a plurality of graphics channels;
(b) increasing the dynamic range of the graphic channels by restricting the intensity vales of separate polygons to a subset of the graphics system's dynamic range;
(c) dividing each polygon vertex intensity into a base and an offset;
(d) creating an extended precision channel by processing the base and offset through separate red, green, blue and alpha (RGBA) graphics channels to define an extended data width channel;
(e) using the offset to represent the amount that each vertex varies in intensity from the base.

20. A method as in claim 19, further comprising the step of adding up the results of the base and offset for output to a video display.

21. The method as in claim 19, further comprising the step of insuring that an intensity step size is always smaller than the intensity gradient when the intensity step size is larger than the minimum intensity step size.

22. A method for extending the data width of a graphics processing channel, comprising the steps of:
(a) providing a plurality of graphics processing channels that are hardware defined as 8-bit channels;
(b) combining output from at least two graphics processing channels;
(c) creating at least one extended data width channel having an increased output that provides at least 12-bits of data width output while keeping the intensity step size smaller than an intensity gradient.

23. A method as in claim 22, further comprising the step of creating the at least one extended data width channel that has a data width that is selected from the group consisting of 12-bits, 16-bits, 20-bits, 24-bits, 32-bits and 64-bits.

24. A method as in claim 22, further comprising the step of combining a portion of a first 8-bit graphics processing channel and a portion of a second 8-bit graphics processing channel to produce the extended channel with extended data width.

* * * * *